UNITED STATES PATENT OFFICE.

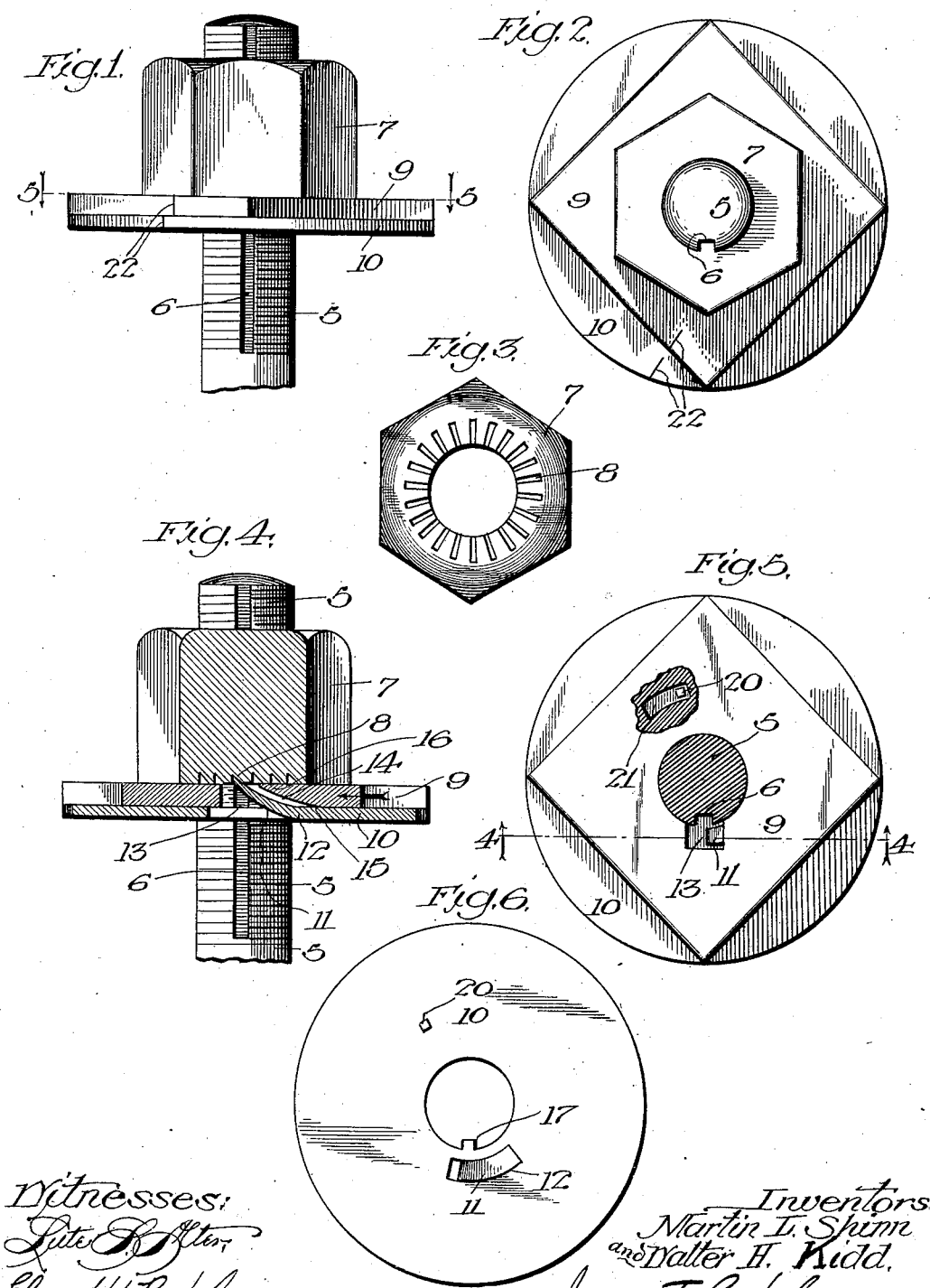

MARTIN L. SHINN AND WALTER H. KIDD, OF LOS ANGELES, CALIFORNIA.

NUT-LOCK.

991,379.  Specification of Letters Patent.  Patented May 2, 1911.

Application filed November 26, 1909. Serial No. 529,913.

*To all whom it may concern:*

Be it known that we, MARTIN L. SHINN and WALTER H. KIDD, citizens of the United States, residing at Los Angeles, in the county of Los Angeles and State of California, have invented new and useful Improvements in Nut-Locks, of which the following is a specification.

This invention relates to improvements in nut locks of the ratchet type; and it consists particularly in an improved combination whereby the simplified mechanism of the lock is practically all embodied in a pair of washers, these washers being very easily manufactured. All that is placed on the nut itself is a series of ratchet teeth on its under face. These teeth are so formed that they may be made in one operation with the pressing of the nut. The only addition made to the bolt is a small groove or slot in which a lug on the inner periphery of one of the washers engages.

One of the main objects of the present invention is to provide a nut lock which may be easily unlocked when occasion arises, but which has its mechanism entirely inclosed and protected from any accidental unlocking as well as from the action of the elements.

In its present preferred form the invention embodies two washers, the lower one provided with a spring tongue which projects up through an aperture in the upper washer. By turning the upper washer so that the aperture does not register with the tongue on the lower washer, the tongue may be forced downwardly and out of engagement with the ratchet teeth on the nut.

In the accompanying drawings, Figure 1 is a side elevation of a bolt equipped with our improved nut lock. Fig. 2 is a plan view of the same. Fig. 3 is a bottom plan view of the nut. Fig. 4 is a longitudinal section taken on line 4—4 of Fig. 5. Fig. 5 is a cross section taken on line 5—5 of Fig. 1. Fig. 6 is a plan view of the lower washer.

In the drawings 5 designates a bolt of usual construction with the exception that it is provided with a square slot 6 extending longitudinally along its screw threaded portion. Nut 7 is of the usual construction with the exception of a series of ratchet teeth 8 arranged on its under face immediately around its screw threaded opening. These teeth may be sunk slightly below the surface for protection.

Upper washer 9 is preferably made in a square configuration, as illustrated, and of some considerable thickness, this washer being preferably made of soft cheap material. Lower washer 10 is thinner than washer 9 and is constructed of spring steel. This washer 10 has a tongue 11 stamped up out of it in the configuration shown in Fig. 4. An aperture 13 is provided in washer 9 and tongue 11 projects up through the aperture. This aperture is provided on one end with an overhanging wall 14. By this construction a point 16 is formed which will press downwardly and forwardly on tongue 11 if washer 9 is moved in the direction indicated by the arrow. Normally tongue 11 projects up into the ratchet teeth 8 on the bottom of the nut. If washer 9 is moved on washer 10 in the direction indicated by the arrow, point 16 will engage with the upper end of tongue 11 and force it forwardly and downwardly out of engagement with the ratchet teeth. A lug 20 on washer 10 and a slot 21 in washer 9 are so arranged that the shoulder formed by one face of the lug and that formed by the end of the slot come into contact with each other just as the tongue is forced out of engagement with the ratchet teeth, thus preventing washer 9 from being moved any farther and preventing tongue 11 from being flattened down entirely.

Lower washer 10 is prevented from rotating on bolt 5 by means of a square lug 17 which projects from its inner periphery into slot 6. When nut 7 is being screwed down the ratchet teeth will move over the end of tongue 11. When the nut is clear down the tongue will engage with the ratchet teeth as illustrated. To prevent washer 9 from being moved in the direction indicated by the arrow by reason of frictional engagement with the nut, it may be advisable to slightly roughen one or both of the engaging surfaces of the two washers. However, if washer 9 should move in that direction while the nut is being screwed down, it is only necessary to move the washer back to the position shown in order to allow the tongue to engage with the ratchet teeth. The nut will remain in its locked position until it is desired to be removed. For this operation a wrench is placed on washer 9 and the washer is moved on washer 10 in the direction indicated by the arrow until lug 20 and slot 21 engage with each other. Tongue 11 is then pressed down into aperture 13 so that it cannot engage with the ratchet teeth. The nut may then be backed off without any interference.

To indicate when the washers are in their positions for the locking of the nut, marks 22 may be placed on their edges. When these marks register with each other the nut is locked, and indication is given any one inspecting the bolt.

Having described our invention, we claim:

1. A nut lock, comprising a bolt having a longitudinal slot in its surface, a nut having ratchet teeth on its under surface, a washer bearing against the under surface of the nut and having an aperture therein, one end of the aperture having an overhanging wall, a second washer bearing against the first named washer and having a lug engaging with a longitudinal slot in the surface of the bolt, a spring tongue formed integrally with the second named washer, the tongue projecting obliquely upwardly under the overhanging wall of the aperture in the first named washer, and shoulders on the washers adapted to engage with each other upon a predetermined relative movement of the washers.

2. A nut lock, comprising a bolt, a nut in revoluble engagement with the bolt and having ratchet teeth on its under surface, a washer bearing against the under surface of the nut and having an aperture therein, one end of the aperture having an overhanging wall, a second washer bearing against the first named washer, means for preventing the rotation of the second named washer on the bolt, a spring tongue on the second named washer and projecting obliquely upwardly under the overhanging wall of the aperture in the first named washer, and shoulders on the washers adapted to engage with each other upon a predetermined relative movement of the washers.

In witness that we claim the foregoing we have hereunto subscribed our names this 19th day of November 1909.

MARTIN L. SHINN.
WALTER H. KIDD.

Witnesses:
ELWOOD H. BARKELEW,
JAS. H. BALLAGH.

---

Copies of this patent may be obtained for five cents each, by addressing the "Commissioner of Patents, Washington, D. C."